(12) United States Patent
Duncan

(10) Patent No.: US 7,111,851 B2
(45) Date of Patent: Sep. 26, 2006

(54) COMPACT CARRIER

(76) Inventor: Sharon B. Duncan, 14601 Locustwood La., Silver Spring, MD (US) 20905

( * ) Notice: Subject to any disclaimer, the term of this patent is extended or adjusted under 35 U.S.C. 154(b) by 135 days.

(21) Appl. No.: 10/887,856

(22) Filed: Jul. 12, 2004

(65) Prior Publication Data

US 2006/0006618 A1    Jan. 12, 2006

(51) Int. Cl.
B62B 1/00 (2006.01)
(52) U.S. Cl. .............................. 280/47.26; 280/47.131; 280/47.18; 280/47.24; 280/64; 301/128
(58) Field of Classification Search .......... 280/47.131, 280/47.17, 47.18, 47.24, 63, 64, 47.21, 47.26, 280/47.29; 301/128
See application file for complete search history.

(56) References Cited

U.S. PATENT DOCUMENTS

| | | | | |
|---|---|---|---|---|
| 4,593,841 A | | 6/1986 | Lange | |
| 5,163,695 A | * | 11/1992 | Pakowsky | ................... 280/79.7 |
| 5,332,243 A | * | 7/1994 | Berry | ........................... 280/35 |
| 5,772,223 A | * | 6/1998 | Letourneau | ............ 280/47.131 |
| 5,820,141 A | | 10/1998 | Wilkerson et al. | |
| 5,863,056 A | * | 1/1999 | Hostetter | ................ 280/47.371 |
| 5,871,220 A | * | 2/1999 | Lombard | ................... 280/79.7 |
| 5,984,154 A | | 11/1999 | Scicluna | |
| 6,070,906 A | | 6/2000 | Allen | |
| 6,142,491 A | * | 11/2000 | Darling, III | ................... 280/30 |
| 6,142,492 A | * | 11/2000 | DeLucia | ................ 280/47.331 |
| 6,561,395 B1 | | 5/2003 | Lim et al. | |
| 6,579,051 B1 | * | 6/2003 | Echternacht | .................. 414/11 |
| 6,637,761 B1 | * | 10/2003 | Boettcher | ................ 280/47.24 |
| 6,796,564 B1 | * | 9/2004 | Kelly | ....................... 280/47.24 |
| 2002/0041084 A1 | | 4/2002 | Darling, III | |

FOREIGN PATENT DOCUMENTS

DE           433498         4/1927

* cited by examiner

Primary Examiner—Christopher P. Ellis
Assistant Examiner—Brian Swenson
(74) Attorney, Agent, or Firm—Richard C. Litman

(57) ABSTRACT

The compact carrier is a compact, lightweight carrier for personal articles such as a child's book bag or backpack. The compact carrier comprises an open base cradle adapted for carrying heavy personal articles. A pair of wheels are disposed on opposing ends of the open base cradle, and a tether is coupled to the base cradle 20 for pulling the compact carrier. The base cradle is formed of two semi-cylindrical half members that are slidably joined together such that the base cradle bay be extended in width for use, or compacted in width for storage. In use, heavy personal articles such as a child's book bag or backpack are placed on or within the base cradle, and secured in place by straps disposed along the tether.

9 Claims, 7 Drawing Sheets

COMPACT CARRIER

BACKGROUND OF THE INVENTION

1. Field of the Invention

The present invention relates to wheeled carriers for luggage, personal articles, and the like. More specifically, the invention is a compact carrier for transporting personal items such as a child's backpack or book bag. When not in use, the compact carrier collapses to a compact configuration for storage.

2. Description of the Related Art

Wheeled hand-carts and other devices for transporting luggage and other heavy personal effects have been known in various forms and, configurations for a relatively long time. Collapsible wheeled carts provide the utility of a wheeled cart with the convenience that the cart may be collapsed in size for storage when not in use. Such carts are typically constructed of rigid frame members, such as metal or plastic tubular members. Typically, however, rigid frame and handle members limit the degree to which the cart may be compacted. Reducing the size or number of frame members also risks a reduction in the cart's sturdiness, and capacity for weight carrying.

U.S. Patent Application Publication 2002/0041084, published on Apr. 11, 2002 for C. Darling III, discloses a versatile portable cart useful for numerous carrying or hauling applications. The cart is readily assembled and disassembled, the disassembled cart being stored in a carry-bag.

U.S. Pat. No. 4,593,841, issued on Jun. 10, 1986 to R. Lange, discloses a pack cart comprising a lightweight tubular frame having removable wheels. The cart frame is adapted to have a pack bag secured thereon, the bag being releasably attached to the cart frame.

U.S. Pat. No. 5,820,141, issued on Oct. 13, 1998 to C. Wilkerson et al., discloses a one-man carrier and back pack comprising a collapsible frame fashioned from lightweight tubular material. The frame is supported by a single wide, inflatable roller for rolling the carrier over terrain.

U.S. Pat. No. 5,984,154, issued on Nov. 16, 1999 to P. Scicluna, discloses a wheeled backpack. The wheeled backpack has a pair of wheels, located on a bottom rear portion of the backpack, and a rigid frame supporting the wheels and including a pull-handle comprising tubular members that telescope from a pocket on the rear of the backpack. While the wheeled backpack provides the capability to wheel the backpack when filled with heavy contents such as school books, the backpack is rendered less suitable for other activities such as a hike outdoors where light weight is preferred.

U.S. Pat. No. 6,070,906, issued on Jun. 6, 2000 to T. Allen, discloses a wheeled ski and equipment carrying device comprising a pair of wheels supported by a rigid axle, the axle having a support means to retain at least one pair of skis.

U.S. Pat. No. 6,561,395, issued on May 13, 2003 to M. Lim et al., discloses a backpack structure comprising a horizontally positioned, wheeled base member having a sliding front portion. An expandable and compressible backpack is mounted on the base member.

German patent 443,498, dated Apr. 30, 1927, illustrates a carrier for skis comprising a pair of wheels supported by a rigid axle, the axle having means for retaining the tips of a pair of skis.

None of the above inventions and patents, taken either singly or in combination, is seen to describe the instant invention as claimed. Thus a compact carrier solving the aforementioned problems is desired.

SUMMARY OF THE INVENTION

The compact carrier is a small, wheeled carrier for heavy personal articles such as a book bag or a backpack. The compact carrier comprises a base cradle for supporting the personal articles. Wheels are mounted on opposing ends of the base cradle. A tether, or pulling handle, is disposed coupled to the base cradle, so that an article placed in the base cradle may be conveniently pulled along by a user. Straps are located along the tether to secure an article being carried by the compact carrier.

The base cradle is formed of two half cradle members that are slidably joined to one another so that the base cradle may be extended or collapsed in width for use or storage. The half cradle members are each a half-cylindrical member, having a walled end and an open end.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
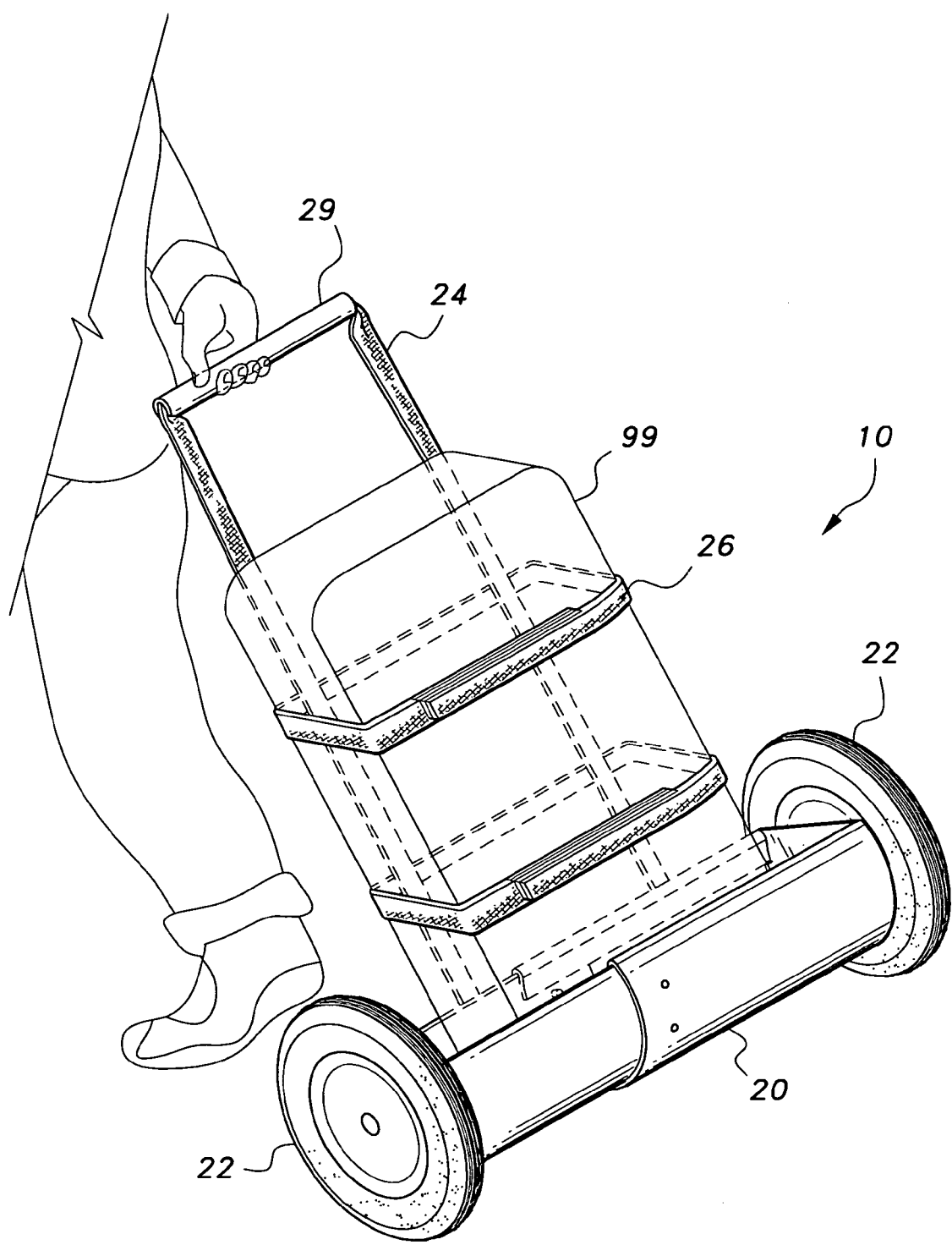
FIG. 1 is an environmental, perspective view of a compact carrier according to the present invention.

The present invention is a compact carrier, designated generally as 10 in the drawings. Referring to FIG. 1, the compact carrier 10 comprises an open base cradle 20 adapted for carrying heavy personal articles such as a child's book bag or backpack 99. A pair of wheels 22 are disposed on opposing ends of the open base cradle 20, and a tether 24 is coupled to the base cradle 20. In use, heavy personal articles such as a child's book bag or backpack 99 are placed on or within the base cradle 20, and secured in place by straps 26 disposed along the tether 24. The compact carrier 10 is pulled by the tether 24, rolling easily along the ground to transport the child's book bag or backpack 99 or other heavy personal articles.

Figure 2:
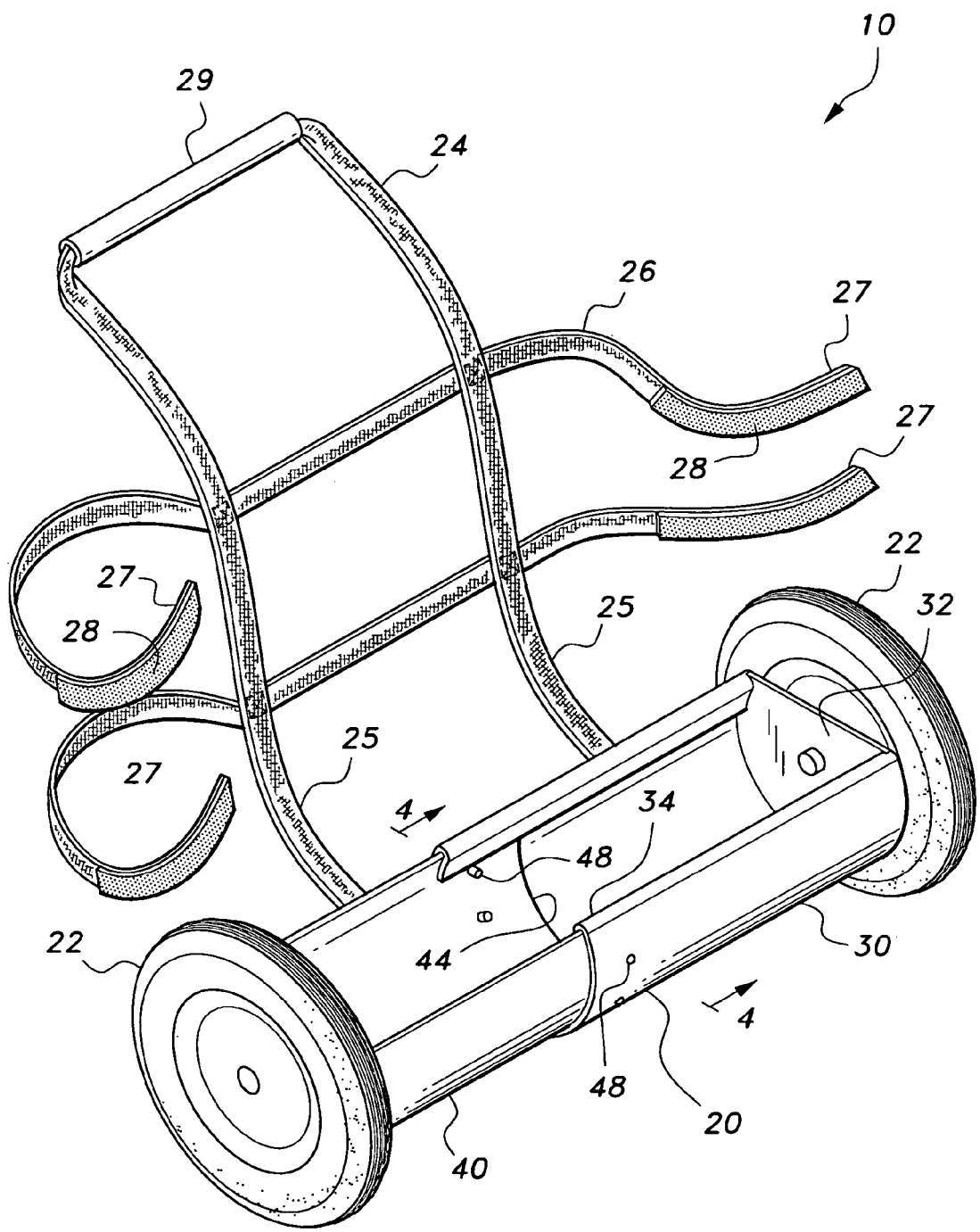
FIG. 2 is a perspective view of a compact carrier according to the present invention.
Figure 3:
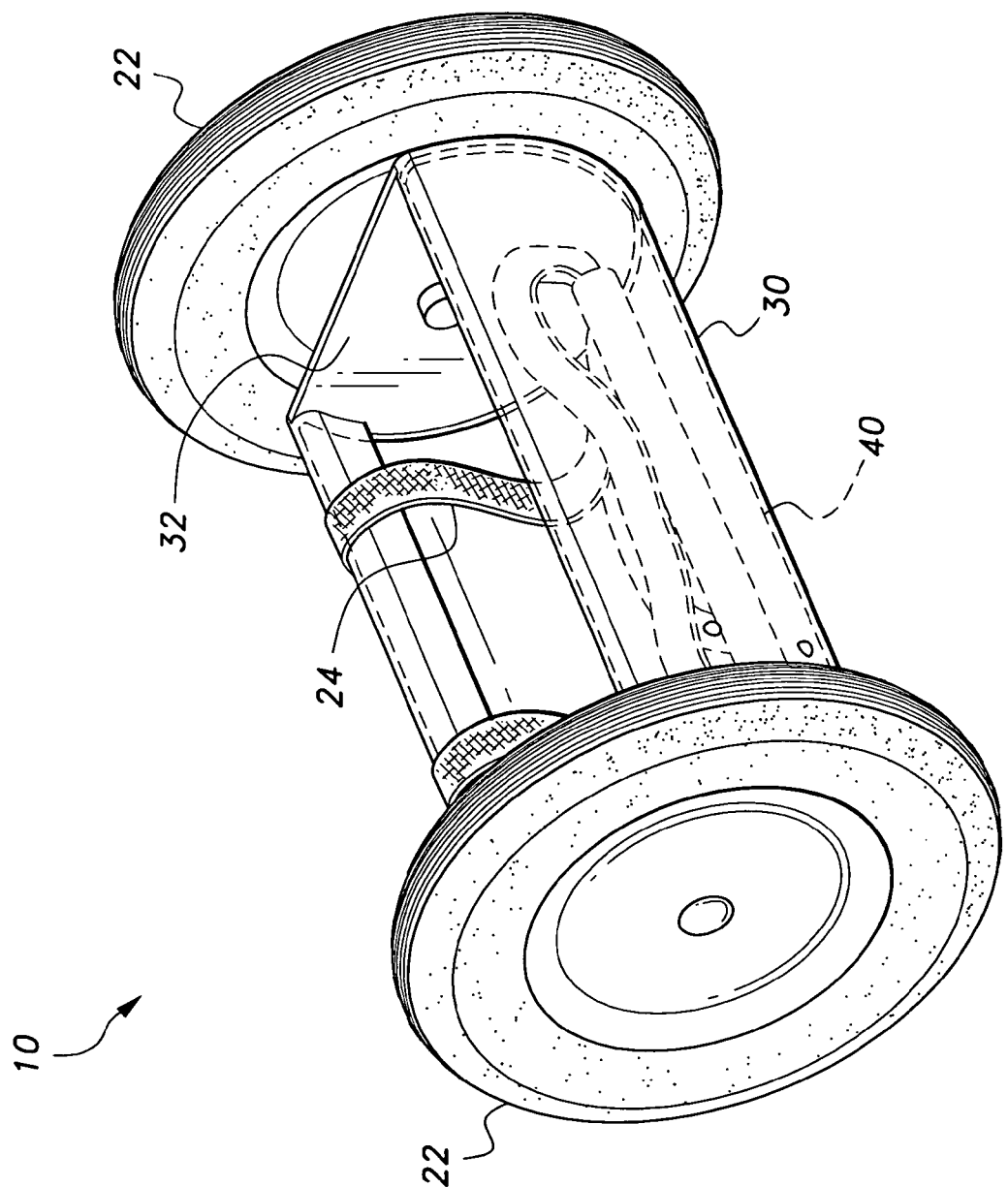
FIG. 3 is a perspective view of a compact carrier according to the present invention compacted for storage.
Figure 4:
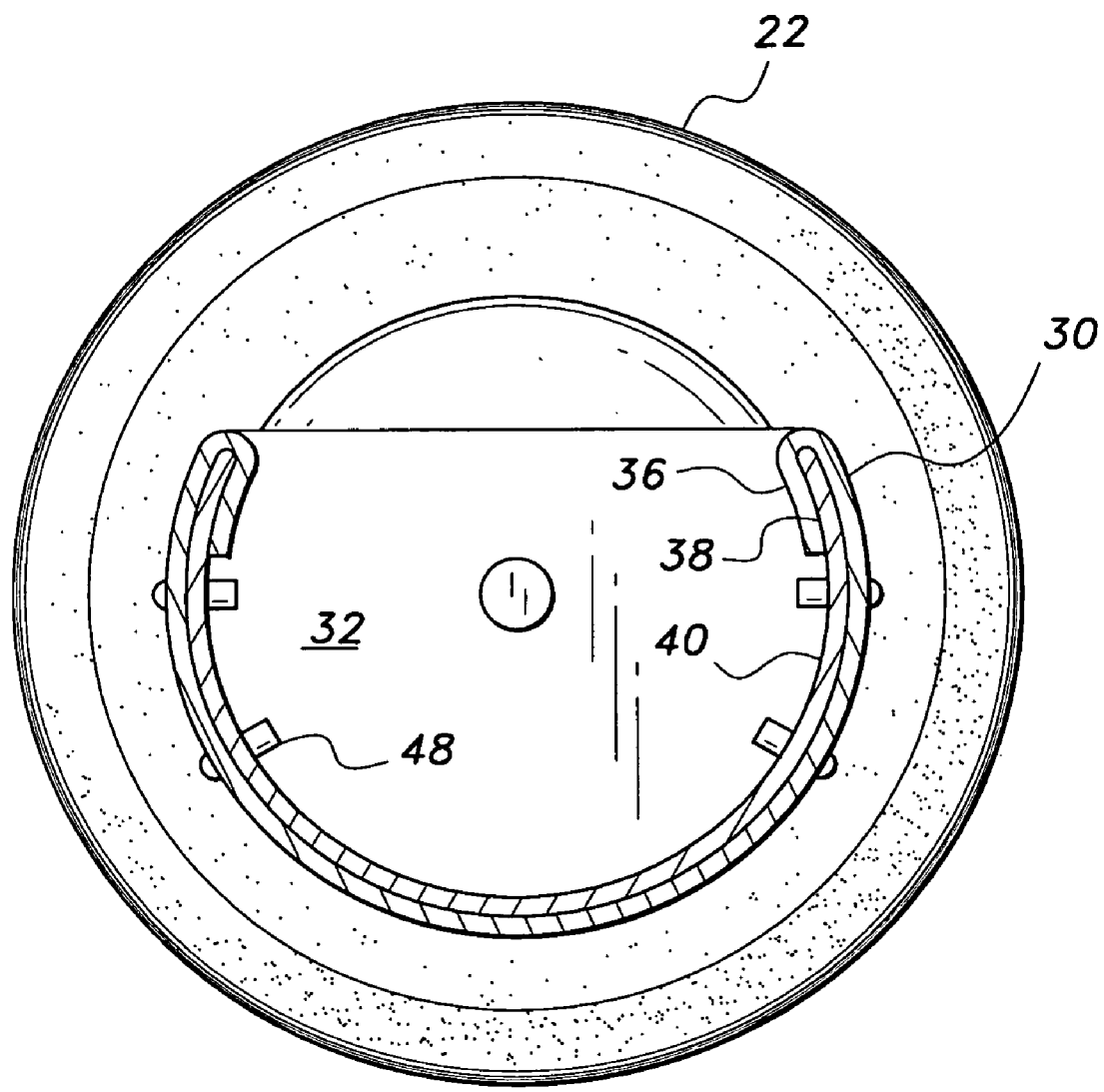
FIG. 4 is a section view drawn along lines 4—4 of FIG. 2.

Turning now to FIGS. 2–4, the base cradle 20 is made to be telescopically collapsible in width to facilitate storage of the compact carrier 10 when not in use. The base cradle 20 comprises a pair of half cradle members slidably engaged with one another whereby the width of the base cradle 20 is telescopically variable. A first half cradle member 30 is a semi-cylindrical shell having a walled end 32 and an open end 34. A second half cradle member 40 is, similarly, a semi-cylindrical shell having a walled end 42 and an open end 44. The second half cradle member 40 has an outer diameter slightly smaller than the inner diameter of the first half cradle member 30 such that the open end 44 of the second half cradle member 40 may be slidably received in the open end 34 of the first half cradle member 30. Thus, the base cradle 20 may be extended into an open position (FIG. 2), or collapsed into a closed position (FIG. 3).

Top side edges 36 of the first half cradle member 30 are bent inward to form channel tracks 38 to retain the second half cradle member 40 slidably engaged with the first half cradle member 30.

Spring biased button latch members 48 are disposed on the second half cradle member 40, the button latch members 48 engaging with apertures formed in the first half cradle member 30 when the base cradle 20 is extended into its open position.

The tether 24 comprises at least a single length of a webbing or similar strong, yet flexible material coupled at one end to the base cradle 20. In a preferred embodiment, the tether 24 comprises a single length of flexible webbing material doubled into an elongated "U", with ends 25 of the tether 24 coupled to the base cradle 20. A handle member 29 such as a short length of flexible, semi-rigid, or rigid plastic tubing is disposed on the tether 24 for an improved grip. Straps 26 are lengths of webbing material transversely attached to the tether 24, having free ends 27. The free ends 27 of the straps 26 include fasteners such as buckles or clasps or the like, or preferably a hook-and-loop type fastener 28 (such as Velcro®). In the preferred embodiment, a pair of straps 26 is used, a hook-and-loop type fastener component 28 disposed on the free ends 27 of each strap 26 to secure the free ends 26 about a personal articles positioned in the base cradle 20. Because the tether 24 and straps 26 are made form webbing material, or another similarly flexible material, the tether 24 and straps 26 are easily stowed within the base cradle 20 when the compact carrier 10 is collapsed for storage. It can be appreciated that a variety of alternate tether and strap configurations may be employed.

Figure 5:
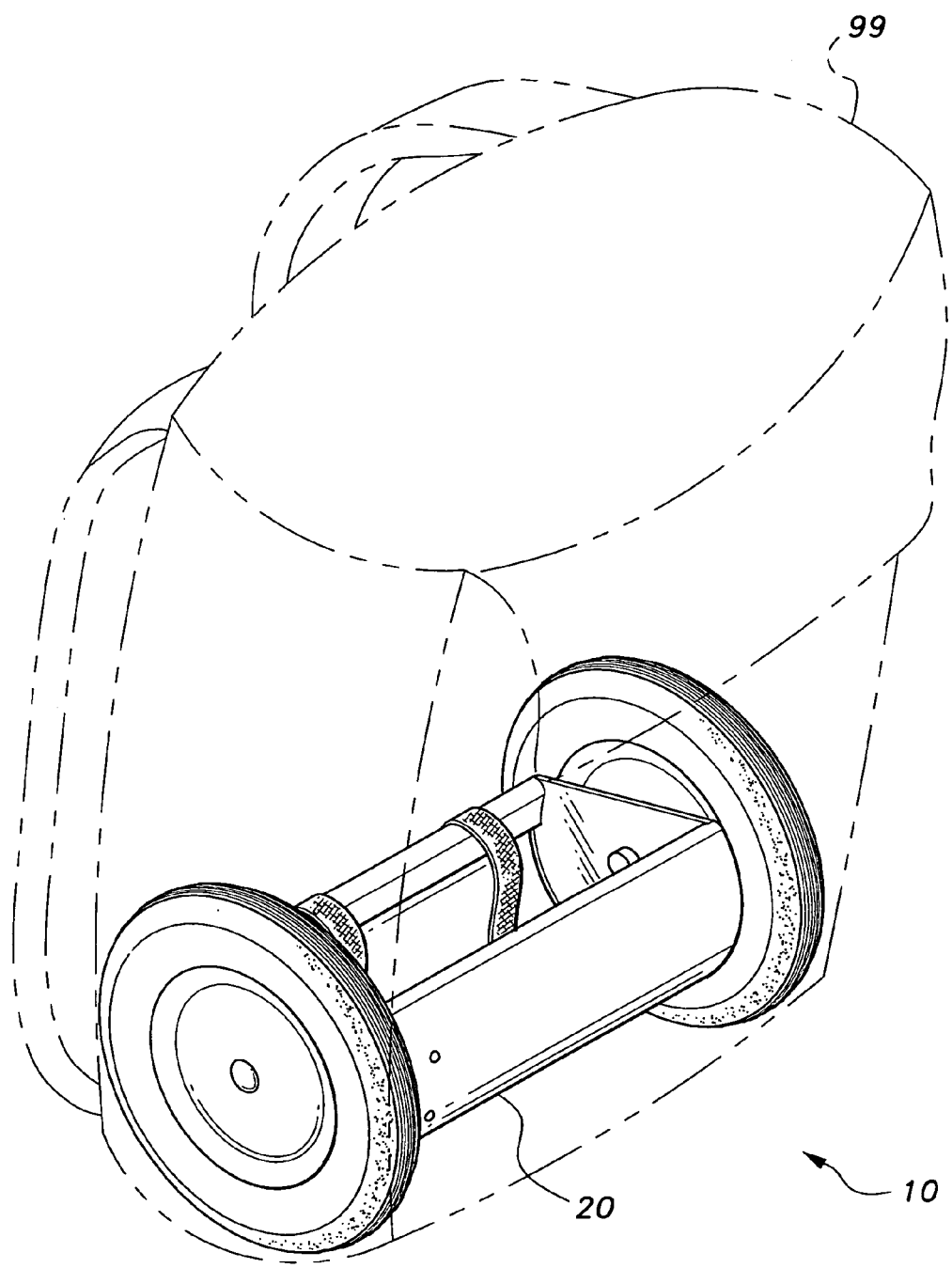
FIG. 5 is a perspective view of a compact carrier according to the present invention compacted for storage compacted and stowed within a backpack.

Referring to FIG. 5, the compact carrier 10 is readily storable inside a backpack 99 or the like. It can be appreciated that, because of the semi-cylindrical form of the base cradle 20, the compact carrier 10 may be stored inside a backpack 99 taking up very little space since the interior of the semi-cylindrical base cradle 20 may be filled with contents of the backpack 99.

Figure 6:
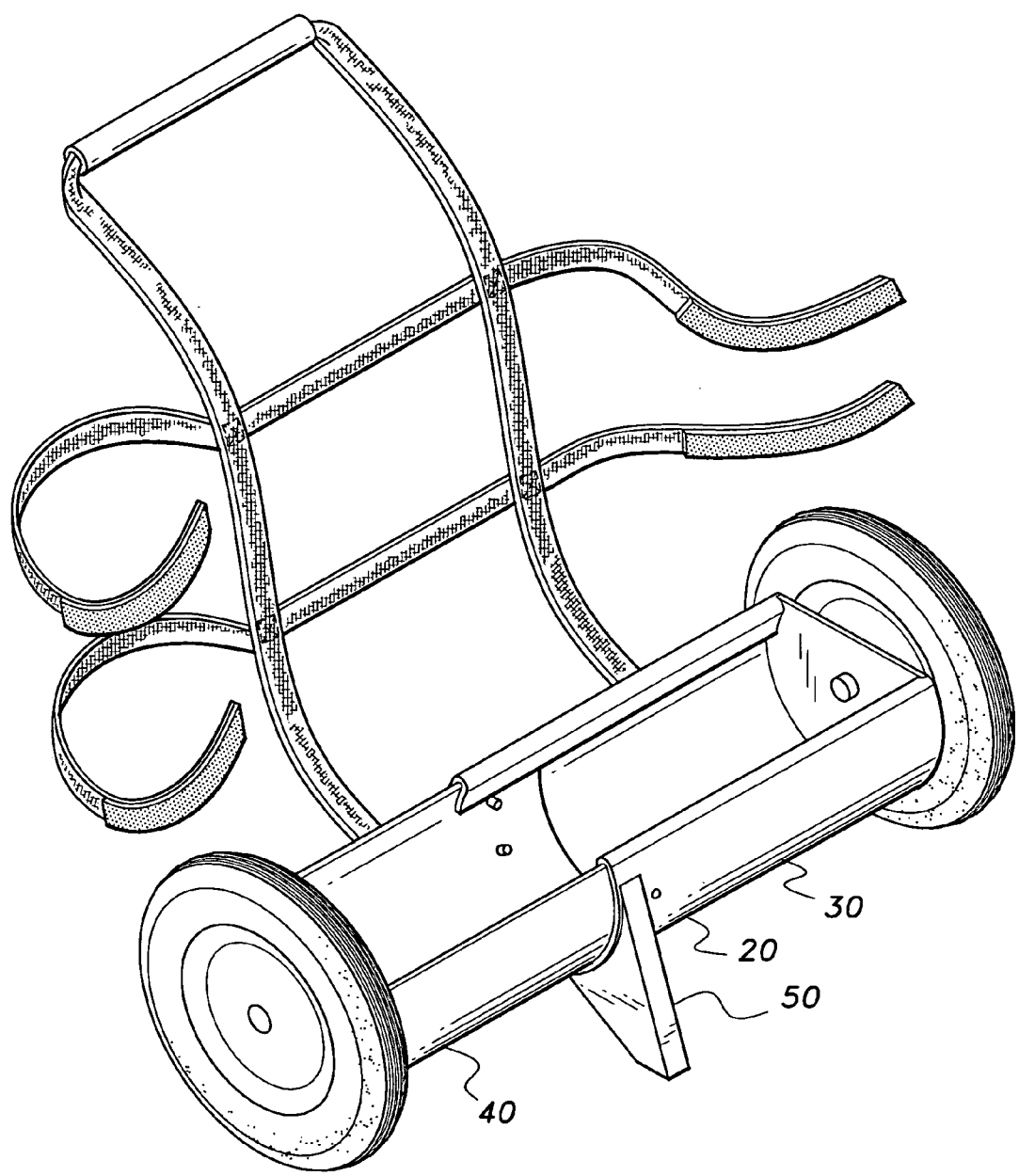
FIG. 6 is a perspective view of a compact carrier according to the present invention incorporating a stand member to support the compact carrier in an upright position.

Turning to FIG. 6, a support member 50 may be disposed in the base cradle 20 of the compact carrier 10 so that the compact carrier 10 is self-supporting in an upright position. The support member 50 is a blade or fin-like member extending from the first half cradle member 30. The support member 50 is positioned to be generally central between the wheels 22 when the base cradle 20 is in it's open position.

Figure 7:
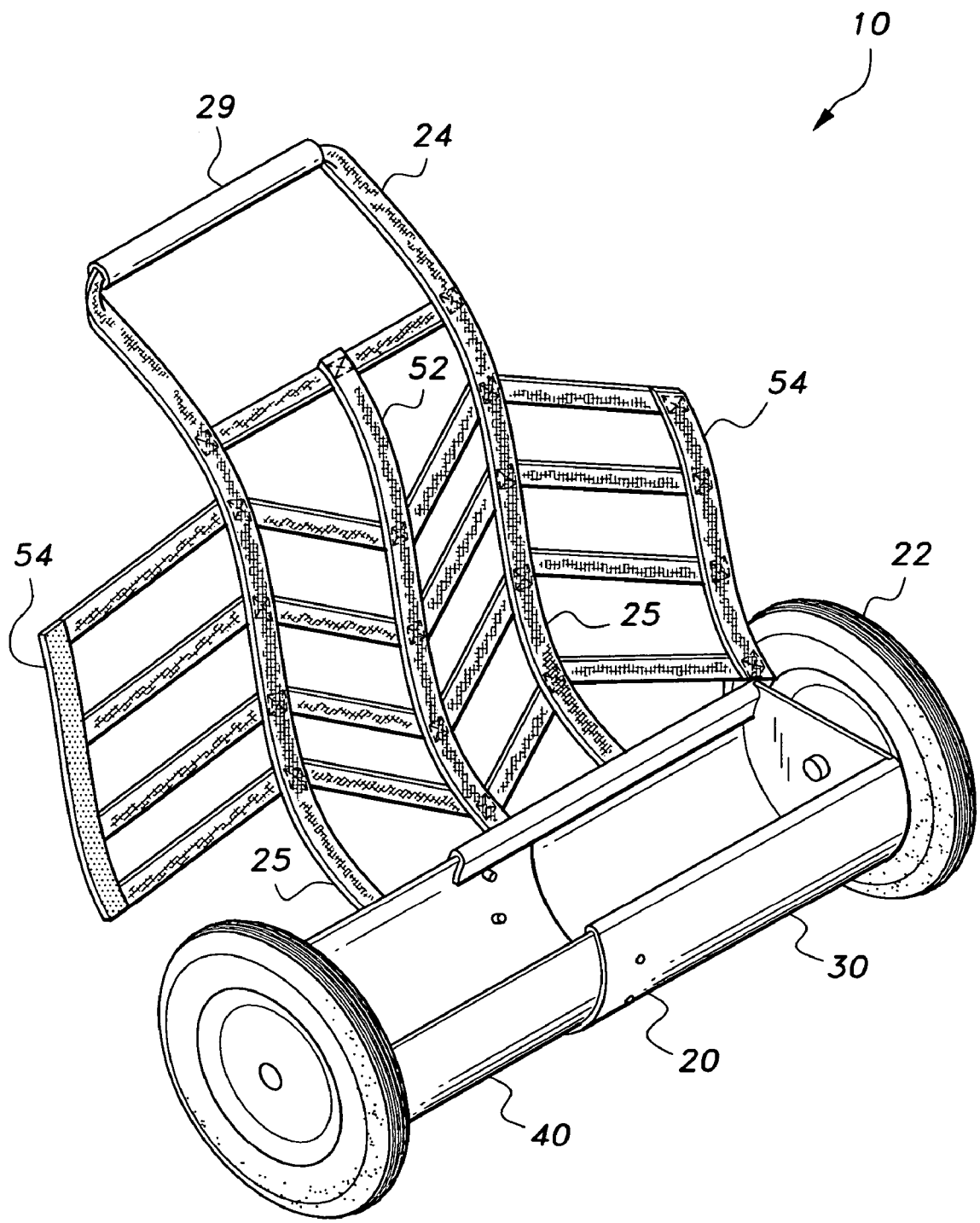
FIG. 7 is a perspective view of a compact carrier according to the present invention showing an alternate arrangement for tether straps.

Turning to FIG. 7, an alternative arrangement of the tether 24 and straps 26 is illustrated. Additional straps 26 are provided, along with a central or "spine" webbing 52 extending generally parallel to and between the tether ends 25. Each of the straps 26 is fastened to the spine webbing 52 generally at the midpoint of the strap 26. The straps 26 may be drawn, by the spine webbing 52 into a "V" shape. Closure strips 54 of webbing join the strap ends 27, and are faced with hook and loop fastener components to secure the straps 26 about an article carried by the compact carrier 10.

It is to be understood that the present invention is not limited to the embodiment described above, but encompasses any and all embodiments within the scope of the following claims.

I claim:

1. A compact carrier, comprising:
 an open base cradle having a width and depth, wherein the width is telescopically variable, said base cradle comprising a pair of half cradle members, each of the half cradle members having an open end and a walled end, the open ends being slidably engaged with one another;
 a pair of wheels disposed on opposing ends of said base cradle;
 a tether coupled to said base cradle.

2. The compact carrier according to claim 1, wherein said tether is made of a flexible webbing material.

3. The compact carrier according to claim 1, further comprising a handle disposed on said tether.

4. The compact carrier according to claim 1, further comprising at least one retaining strap fastened to said tether.

5. The compact carrier according to claim 4, wherein each said least one retaining strap has two free ends, each of the free ends having a hook and loop fastener affixed thereto.

6. The compact carrier according to claim 1, further comprising a support member extending from said base cradle.

7. The compact carrier according to claim 1, wherein said half cradle members are semi-cylindrical.

8. The compact carrier according to claim 1, wherein said pair of half cradle members consists of a first semi-cylindrical half cradle member having an inside diameter and a second semi-cylindrical half cradle member having an outside diameter slightly less than said inside diameter.

9. The compact carrier according to claim 1, wherein each of said wheels is attached to the walled end of one of said half cradle members, respectively.

* * * * *